United States Patent [19]

Greaves

[11] 4,427,023

[45] Jan. 24, 1984

[54] DRY PRODUCT VALVE

[75] Inventor: James D. Greaves, Solon, Ohio

[73] Assignee: General Signal Corporation, Stamford, Conn.

[21] Appl. No.: 248,194

[22] Filed: Mar. 27, 1981

[51] Int. Cl.³ .................... B08B 3/04; F16K 25/00
[52] U.S. Cl. .................... 137/240; 134/166 C; 251/174; 251/178; 251/250.5
[58] Field of Search ............ 134/166 C; 137/240; 251/174, 177, 178, 250.5

[56] References Cited

U.S. PATENT DOCUMENTS

| | | | |
|---|---|---|---|
| 261,826 | 8/1882 | Boeklen | 210/536 |
| 1,099,200 | 6/1914 | Patterson | 251/250.5 |
| 1,219,392 | 3/1917 | Hagen | 251/250.5 |
| 1,632,220 | 6/1927 | Demarest | 251/178 |
| 1,723,264 | 8/1929 | Wilson | 251/177 |
| 3,047,006 | 7/1962 | Ivanseau | 251/177 |
| 3,428,366 | 2/1969 | Harvey | 137/240 |
| 3,918,471 | 11/1975 | Bedner | 137/240 |
| 4,174,728 | 11/1979 | Usnick et al. | 137/240 |
| 4,249,560 | 2/1981 | Raque | 137/240 |
| 4,292,992 | 10/1981 | Bhide | 137/240 |

*Primary Examiner*—George L. Walton
*Attorney, Agent, or Firm*—Pearne, Gordon, Sessions, McCoy, Granger & Tilberry

[57] ABSTRACT

Method and means for solidifying nuclear waste for permanent disposal are disclosed. A storage container, in the preferred form of a drum or barrel, is charged with a predetermined amount of liquid polymer resin in an uncatalyzed state. Catalyst-containing frangible ampoules are also positioned in the drum with a rotatable mixer mechanism. At a waste filling station, the mixer is rotated to break the ampoules so as to mix the catalyst and the resin. The catalyzed resin is then mixed with added waste material to completely encapsulate the waste prior to solidification of the resin. Monitoring of the filling and mixing process is provided by continually sensing the torque force being applied to the rotating mixer mechanism. Where the waste is a dust-like, dry particulate material, dust control means and method are also provided.

8 Claims, 17 Drawing Figures

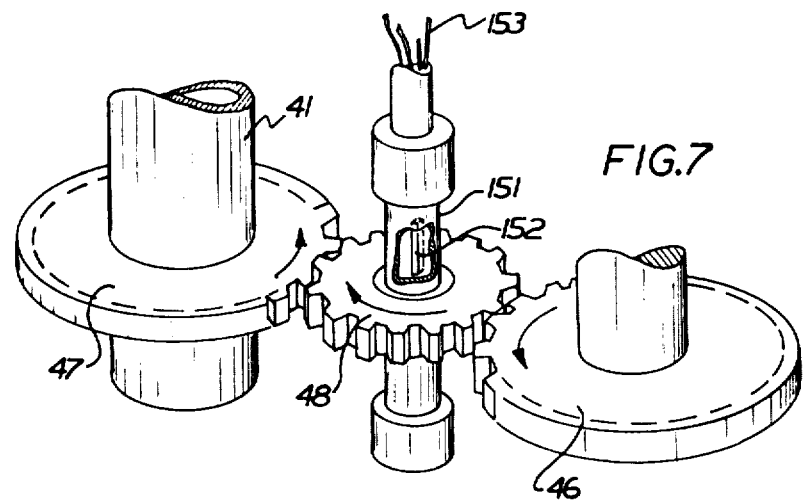
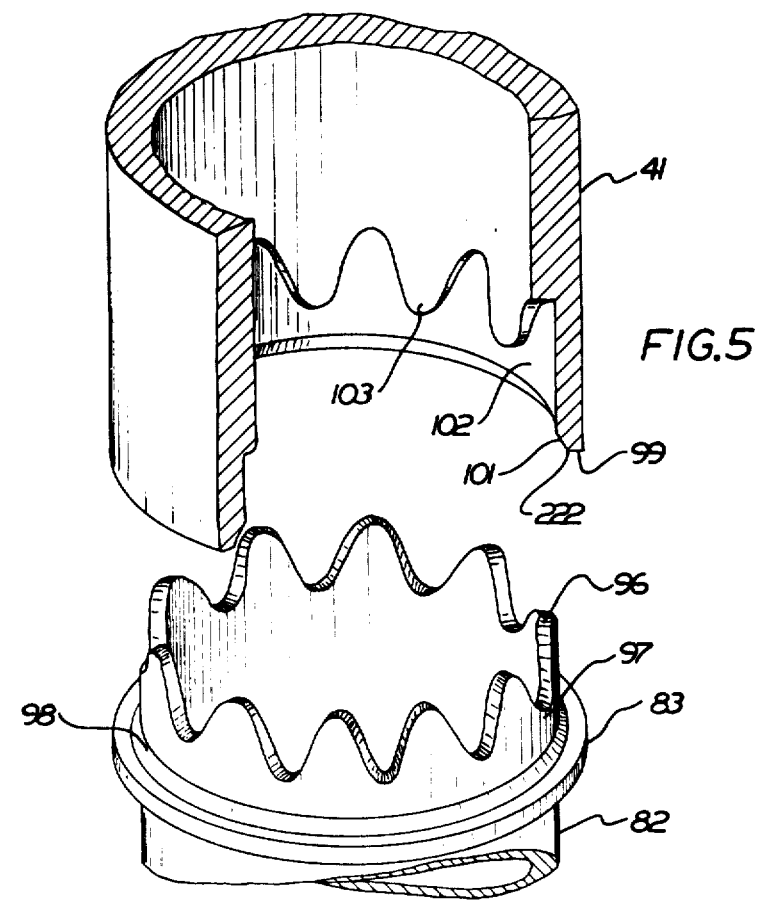

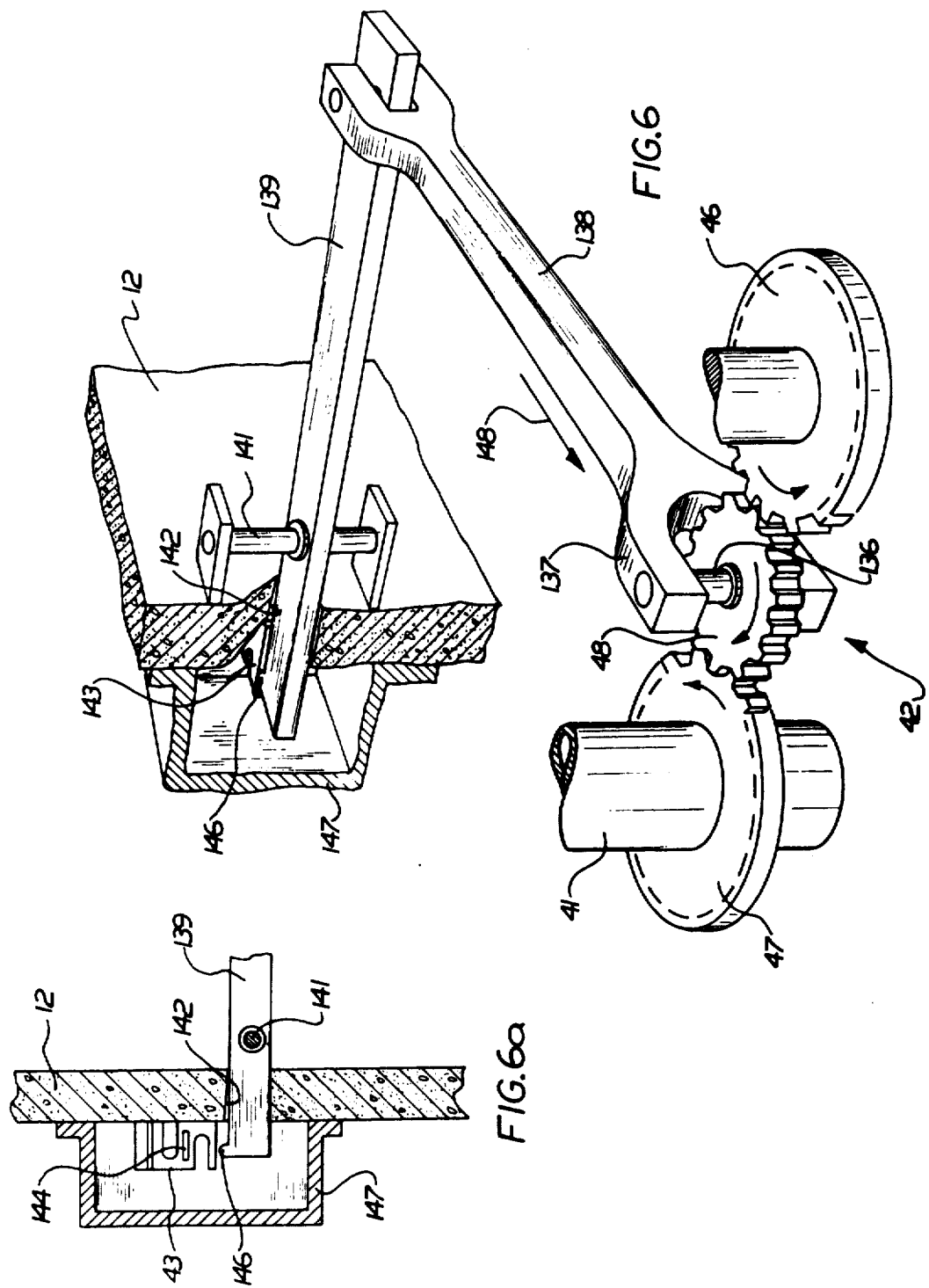

DRY PRODUCT VALVE

BACKGROUND OF THE INVENTION

This invention relates generally to the handling and disposal of toxic materials such as radioactive waste material or the like, and more particularly to a method and apparatus for preparing such material for long-term storage.

PRIOR ART

It is known to prepare radioactive waste for long-term storage by mixing the waste with a solidifying agent and then solidifying the mixture in containers, such as drums or barrels, so that even if the container loses its integrity, the freestanding, solidified waste will not readily pass into the environment. Examples of such systems are described in U.S. Letters Pat. Nos. 3,835,617; 4,119,560; 4,139,488; and 4,168,243.

One such system is described in U.S. Pat. No. 3,835,617 and divisional cases thereof comprising U.S. Pat. Nos. 3,932,979; 3,940,628; 3,966,175; and 4,030,708. All of these patents are assigned to the assignee of the present invention and are incorporated heren by reference in their entireties. Such system provides for the mixing of water containing radioactive waste with dry cement within a drum or barrel so that the mixture is solidified to form a freestanding mass for long-term storage.

The system and the apparatus disclosed in the '617 patent are arranged to minimize exposure of operating personnel to hazardous conditions and to minimize the possibility of area contamination with radioactive waste. This system may be referred to as a "wet system" and is used with radioactive waste combined with a liquid containing water. In such system, the liquid portion of the waste is used to activate the solidification of the cement.

This prior art system prevents radiation exposure of operating personnel by providing apparatus allowing such personnel to remotely control and monitor the operation of the system from a shielded location where harmful radiation cannot reach the operating personnel. The apparatus is designed and structured to provide reliable operation and shielded access to those parts of the system which are most likely to require service or maintenance.

It is also known to use resinous materials, such as polymer systems comprising thermosettable resins including vinyl esters, unsaturated polyesters or blends and mixtures thereof which are solidified to encapsulate radioactive waste material. Such resinous material can be used to encapsulate dry waste which results from the removal of liquid from the waste, or can also be used with liquid waste including dissolved solids or mixtures of liquid and solid particulate matter. Such polymer systems and resinous materials are described in U.S. Pat. Nos. 3,792,006 and 4,077,901, such patents also being incorporated herein by reference in their entireties.

SUMMARY OF THE INVENTION

In accordance with the present invention, a novel and improved method and apparatus are provided for the safe and reliable preparation and disposal of toxic waste, such as radioactive waste or the like, for long-term, storage.

The illustrated embodiment of this invention is particularly suited for the handling of dry particulate waste, but it is within the broader aspects of this invention to also provide for the solidification of waste in the form of liquids containing dissolved solids and slurries or dispersions of liquid and solid material. Plastic materials such as the above noted polymer systems and resinous materials are preferred in the processing of dry particulate waste. The invention is illustrated hereinafter with reference to a dry particulate waste and a solidification agent comprising a polymer system.

There are a number of aspects to this invention. In accordance with one of the broader aspects of the invention, drum or container preparation is performed entirely in a safe, shielded location, where operating personnel can work directly on the drum and place in the drum all materials, other than radioactive waste material, required for the entire process.

During such drum preparation, the solidification agent or components thereof required to encapsulate or solidify the waste mixture are placed in the drum. However, the solidification agent components are segregated so that the prepared drum can be stored for reasonable periods of time without any substantial solidification. The segregated components may be desegregated for direct combination thereof within the drum and solidification by operations controlled remote of the drum location. In the illustrated embodiment, the catalyst for the polymer system is the segregated component and it is confined within a frangible container element disposed in the drum.

Further, when the drum is prepared and still in the shielded location, it contains an integral mixing apparatus for desegregating or integrating and mixing the segregated materials so that such mixing apparatus does not have to be inserted during the filling operation.

In accordance with another of the broader aspects of this invention, a novel and improved method and apparatus are provided in which the drumming of the waste is controlled and monitored from a shielded, safe location to fully protect the operating personnel from dangerous exposure to the waste. Still further, monitoring of the process is arranged to reliably verify the performance of each critical aspect of the process.

For example, before the catalyst is mixed to initiate solidification, means are provided to verify that a proper seal is established between a waste supply nozzle and the drum, and to establish that there is no danger of waste leakage. Thereafter, mixing is initiated, and the mixing apparatus is operable to release the catalyst and to mix it with other components of the solidifying agent to initiate the solidifying operation. The components of the solidifying agent are selected and processed, however, so that substantially no solidification occurs before the drum filling operation is completed.

Sensing means (in the illustrated embodiment, torque sensing means which sense the torque required to drive a rotating mixer element in the drum) provide a direct verification of the release of the segregated component of the solidification agent or catalyst. Preferably, this occurs prior to the initiation of waste feeding. The same torque sensing means are used to verify that the waste is entering the drum and being mixed into the solidifying material in a proper manner.

In accordance with another aspect of this invention, the waste feed nozzle performs the dual function of providing a passage through which the waste passes into the drum and also the drive for the drum-contained mixing apparatus.

When the waste is in the form of a dry, particulate material, the apparatus is arranged to ensure that all of the waste material is positively carried beneath the surface of the solidifying material within the barrel, and is fully coated thereby, so that no uncoated waste material is present within the drum. Here again, the torque sensing means monitor the filling and waste coating operations to provide verification that such operations are being properly performed.

In accordance with another important aspect of this invention, a novel and improved mixing apparatus is provided within the drum to provide for the release of the catalyst, mixing of the drum contents, and encapsulating of the waste. The mixing apparatus is also designed to minimize the effect of mixing on the solidification process. To that end, the apparatus is characterized by a low energy and heat input to the polymer system. The mixing apparatus is relatively low in cost and is installed in the drum prior to moving the drum out of the shielded safe side of the system. Further, such apparatus remains in the drum at the completion of the filling operation and during the subsequent storage of the solidified waste material. This ensures that no waste material is removed from the drum to contaminate the filling station.

In accordance with another aspect of this invention, a novel and improved method and apparatus are provided to purge the waste feed system, and to ensure that full control of waste is maintained so that no uncontrolled contaminating waste exists. For example, the drumming station is maintained at a positive pressure higher than the pressure within the drum and within the waste feed system to ensure that any possible leakage will not carry any dustlike waste out of the drum or out of the waste supply system. Similarly, the dynamic seals in the waste feed system are enclosed in pressurized environments so that any leakage which may exist will be into the system to prevent escape of waste.

Positive confinement or control of the dustlike waste is also provided at the completion of the drum filling operation, and after purging of the waste feed system, by capping means which close the waste feed system. Such capping is accomplished in a way so as to ensure that the waste escape does not occur during or before the capping operation. Further, when the drum is sealed, the exterior surface of the drum is tested for contamination, and if surface contamination is found, decontamination steps are performed.

Finally, before moving the filled and sealed drum to a storage and decay area, measurements are made to determine the radiation level of the filled drum and the weight of the filled and sealed drum, and to verify that solidification is in fact occurring.

In accordance with still another aspect of this invention, novel and improved apparatus are provided in which components of the system which are most likely to require service or replacement are located to the maximum extent possible in a shielded location where service personnel can conveniently and safely work. For example, the prime movers for the various operating components of the system are located in shielded, remote locations. Similarly, sensing components, such as electrical sensors and the like, are also located in a shielded, accessible, safe location.

These and other aspects of this invention are more fully described and illustrated in the following description and drawings.

BRIEF DESCRIPTION OF THE DRAWINGS

FIG. 5 is an exploded, perspective view of the driving connection between the waste feed and drive nozzle and the mixing apparatus illustrated in the structure thereof;

FIG. 6 is a schematic view of one embodiment of a torque sensing mixer drive for measuring the torque applied to the mixer;

FIG. 6a is a fragmentary, enlarged view of the load cell incorporated in the torque sensing system of FIG. 6;

FIG. 7 is a schematic view of a second embodiment of the torque sensing mixer drive;

FIG. 15 is a schematic, fragmentary view of the hat valve which closes the feed nozzle when waste is not being fed into a drum.

DETAILED DESCRIPTION OF THE DRAWINGS

The illustrated embodiment of the present invention is particularly suited for the reliable preparation of dry particulate radioactive waste. Such waste is usually produced by removing the water from a liquid mixture or slurry of radioactive waste material in a volume reduction system or the like. The reduction of the waste to dry particulate material is very desirable, since it greatly reduces the volume of the waste, and therefore greatly reduces the volume of the material which must be encapsulated and stored. Since the long-term storage of waste radioactive material presents severe environmental problems, it is important to reduce the volume which must be stored as much as possible.

Generally, such particulate matter will have a particle size in the range of from about 20 mesh down to less than about 5 microns, and the system in accordance with the present invention is capable of accepting waste consisting of particles throughout such size range. In fact, it is within the broader aspects of the present invention to encapsulate for safe storage waste in the form of extremely fine ash resulting from the combustion of dry, active waste such as disposable protective clothing and clean-up materials. It is also within the broader aspects of this invention to prepare for disposal waste materials which comprise liquids, such as solutions containing boric acid, borax, sodium sulfate, and the like, or comprising liquid and solid mixtures, dispersions, or slurries, such as those resulting from the operation of ion exchange resin beds.

When preparing dry particulate material of the type contemplated by this invention for disposal, it is substantially more difficult to control the material than when handling liquid waste or the like. The dry particulate material has higher radioactive levels because of its higher concentration. Further, it contains particles which are quite small and dustlike and very susceptible to being carried by any air leakage into the surrounding environment where it could cause substantial contamination. For this reason, the illustrated embodiment of the invention is provided with means to positively prevent leakage from the waste feed system and from the drum during the drum filling operation. This virtually eliminates the possibility of contamination of the apparatus or its environment.

Figure 1:
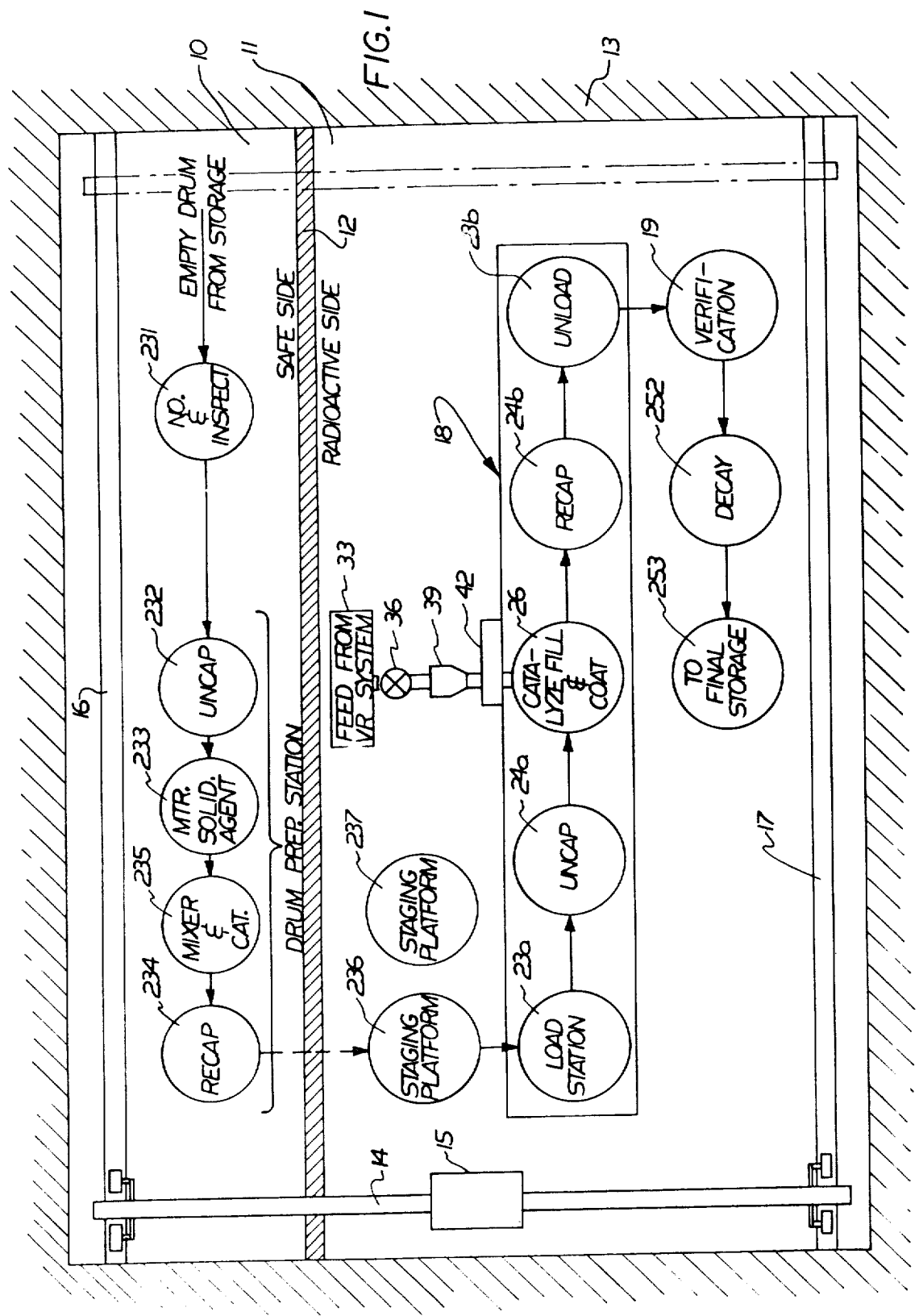
FIG. 1 is a flow diagram of the process for preparing radioactive waste or the like for storage in accordance with the present invention.

Referring to FIG. 1, the illustrated embodiment of a system in accordance with the present invention provides for the drum or container preparation in a shielded "safe side" 10 which is separated from the "radioactive side" 11 of the apparatus by a schematically illustrated shield wall 12. Both the safe side 10 and radioactive side 11 are enclosed by a surrounding shielding enclosure 13 of the general type known in the prior art and described in U.S. Pat. No. 3,835,617 cited above.

Normally, the shield wall 12, which divides the safe side from the radioactive side, is sized to shield operating personnel in the safe side 10 from any dangerous radiation exposure. The shield wall 12 extends upwardly to a location spaced from the roof (not shown) of the enclosure 13 and a power crane 14 mounted on tracks 16 and 17 extends over the wall 12. The crane 14 is provided with a trolley 15 having a drum gripper operable to transfer drums from the safe side 10 into the radioactive side 11, and is movable lengthwise along the enclosure 13 to transfer drums to various locations within the radioactive side 11 during the processing operations and also to locations for initial decay storage.

The preparation of the drum for receiving the radioactive waste material occurs in the safe side 10. Also, the operating personnel monitor and control the process from the safe side 10. The fully prepared drum is transferred over the shield wall 12 by the crane 14 into the radioactive side of the system 11. The actual drumming operation is performed in a drumming station 18 represented in FIG. 1 by a block. In such station, a number of distinct process steps are carried out, as described in detail below. Finally, after the drum is filled and sealed, it is transferred by the crane out of the drumming station 18 to a verification location at 19. From the verification station, the drum is transferred to a storage facility within the enclosure 13, where initial decay occurs. In some instances, the drum will be maintained in the on-site storage facility for a considerable period of time, and in other instances may be transported from the enclosure 13 to a permanent storage or burial site.

Figure 2:
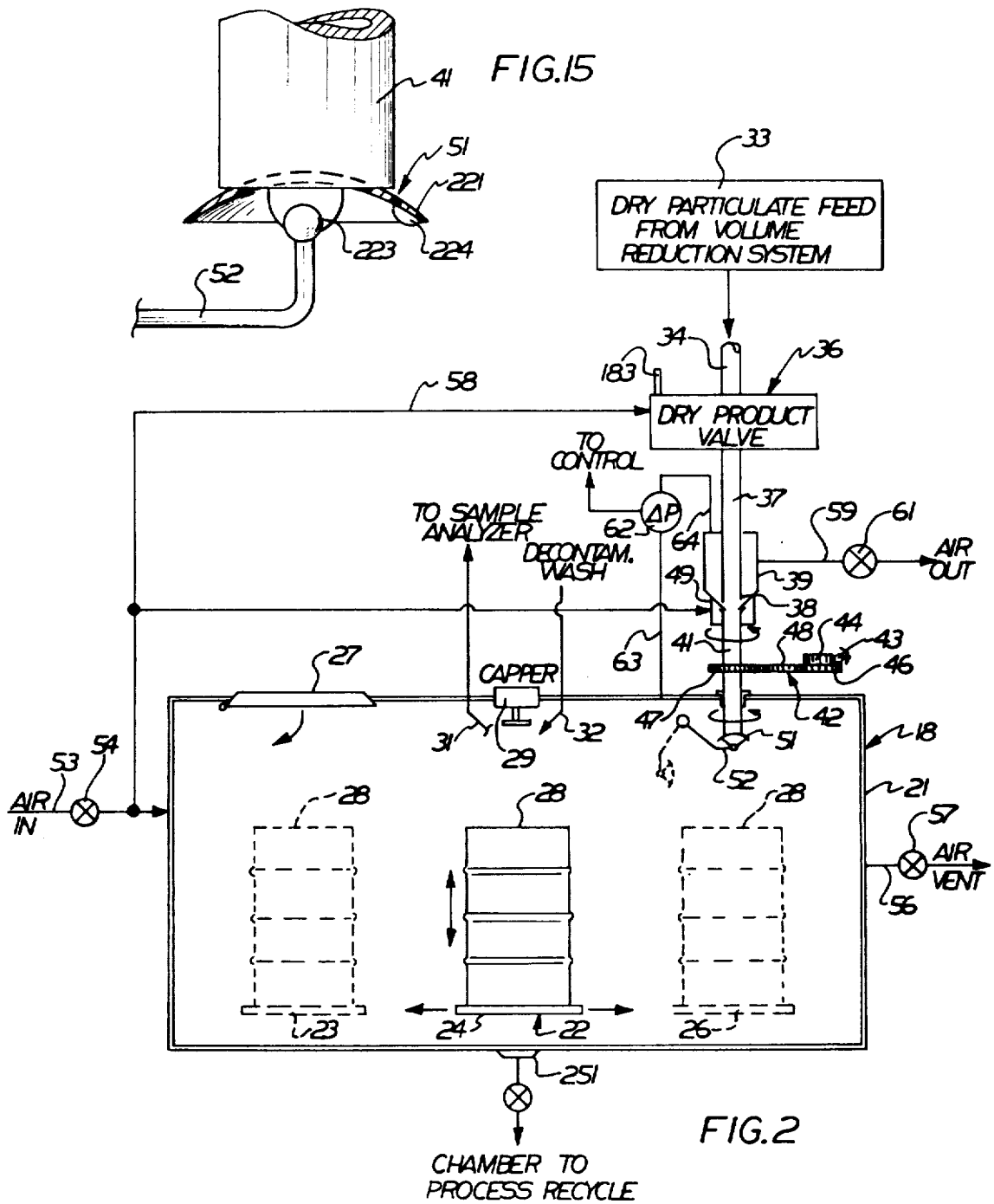
FIG. 2 is a schematic view of the drumming station schematically illustrating the various functional components provided at such station.

FIG. 2 schematically represents the drumming station 18 and the functional equipment directly associated therewith. The drumming station 18 is preferably located within the radioactive side of the system within a zone which is individually shielded from the storage zone so that maintenance can be performed on the equipment within the drumming station, if necessary. However, to the maximum extent possible, the equipment located within the drumming station is designed for operation for extremely long periods of time without any direct maintenance. Further, the equipment at the drumming station is, to a large extent, constructed so that those portions of the system which might require maintenance are located on the safe side 10 of the wall 12. For example, the drives for valves and the electrical portions of the sensors are, in most instances, located on the safe side of the wall 12, where they can be conveniently and safely serviced, and are connected to drives and mechanical mechanisms to the functioning components of the system which must be located within the radioactive side. As an example, and as more fully described below, the prime movers for the mixer and for a dry product valve are located on the safe side 10 and are coupled through the wall 12 to the mechanical portions of the system located at the drumming station.

Further, in the illustrated embodiment, the drumming station 18 itself is enclosed within a pressure vessel 21, which can be maintained at pressures higher than atmospheric pressure to ensure that leakage does not cause loss of control of any of the dustlike, dry particulate radioactive waste.

Located within the pressure vessel or enclosure 21 of the drumming station 18 is a movable drum support 22 which can be moved horizontally from a drum receiving and delivery position 23 to an uncapping and recapping position 24 and a fill position 26. The drum support is also vertically movable in each position so as to raise and lower the drum, as discussed in greater detail below.

In FIG. 1, the loading position and unloading position are illustrated at 23a and 23b as two separate locations of the flow diagram. However, it should be understood that both positions are physically at the same location. Similarly, the uncapping and recapping positions are respectively illustrated at 24a and 24b, and it should be recognized that both operations occur at the same physical location 24 illustrated in FIG. 2.

Referring again to FIG. 2, the pressure vessel 21 is provided with a hatch 27 through which a drum 28 is lowered into the drumming station 18 prior to being filled with radioactive waste and through which the drum 28 is raised or removed after it is charged with the radioactive material.

Located above the capping and uncapping position 24 is a powered capper 29 which is operable to remove the cap from a drum prior to filling and to replace the cap in the drum after filling. Such capper is more fully described in U.S. Pat. No. 3,932,979, supra. Also located above the capping position 24 is a vacuum-type particle sampler 31 which is connected to a sample analyzer (not shown) operable to determine if the outer surface of the drum is contaminated in any way. Similarly, a decontamination wash system 32 is located above the position 24 so that the drum can be decontaminated by a water spray in the event that it is determined that the exterior surface of the drum is contaminated.

Located above the filling position 26 is the waste feed system and mixing drive system. Such system receives the dry particulate radioactive waste from the volume reduction system, indicated generally at 33, through a downcomer line 34. Such system 33 usually includes a hopper in which the dry particulate waste is stored and a powered auger or screw which operates to feed the waste material to the downcomer when waste feeding is required. The downcomer enters the top of a dry product valve 36, described in detail below, which prevents any feed of waste when in the closed position and which allows free waste feed when in the open position.

From the dry product valve 36, the waste passes through a vertical conduit 37 which is open at its lower end at 38 in a purge chamber 39. Connected at the lower end of the purge chamber 39 is a rotatable drive nozzle 41 which serves the dual function of providing a passage through which the particulate waste passes and also functions as the power transmission element for the mixer located within the drum 28. A torque sensing gear drive 42 is connected to the drive nozzle 41 to rotate the nozzle, and in turn rotate the mixer within the drum when required. This drive 42 also is provided with sensing means to sense the mixer torque in the manner described below.

Such gear drive includes a worm gear 43 mounted on the end of a shaft extending through the shield wall 12 to the motor drive for the system. Such motor is located on the safe side 10, where it can be safely and easily serviced. The worm gear 43 meshes with the worm wheel 44 connected to a drive gear 46. A driven gear 47 is connected to the drive nozzle 41 and operates to rotate the nozzle during the mixing operation. An idler gear 48 is interposed between the drive gear 46 and the driven gear 47 to provide a drive connection therebetween and also to provide sensing of the torque being transmitted through the drive in a manner described in detail below.

A dynamic seal is located at 49 between the upper end of the drive nozzle 41 and the purge chamber 39 to prevent any escape of waste material from the feed system. Such seal is described in detail below.

A hat valve 51 is mounted on an arm 52 for movement between the closed position illustrated in FIG. 2, in which it engages the lower end of the drive nozzle 41 and closes off the feed system when waste feed is not required. The hat valve is carried clear of the filling position when the drum 28 is raised by the drum support into sealing engagement with the drive nozzle 41, as described in detail below.

An air pressure line 53 is connected through a valve 54 to the vessel 21 to admit air under pressure to the vessel when pressurization thereof is required. Similarly, a vent line 56 connects the pressure vessel 21 to a vent valve 57 when the vessel is to be vented to reduce the pressure therein.

The dry product valve 36 is provided with a fluidtight housing which is pressurized through a pressure line 58 when the pressure vessel 21 is pressurized. The purge chamber 39 is connected through a line 59 and a purge valve 61 to a suitable filter (not illustrated) which removes any entrained particulate waste from the purging air. A differential pressure sensor 62 is connected to the pressure vessel 21 through a first line 63 and to the purge line 59 through a second line 64. Such differential pressure sensor 62 produces a signal used to control the pressure difference between the pressure in the feed system and the pressure in the vessel 21.

Before describing the overall operating cycle in detail, a novel and improved component of the system will be first described.

Figure 3:
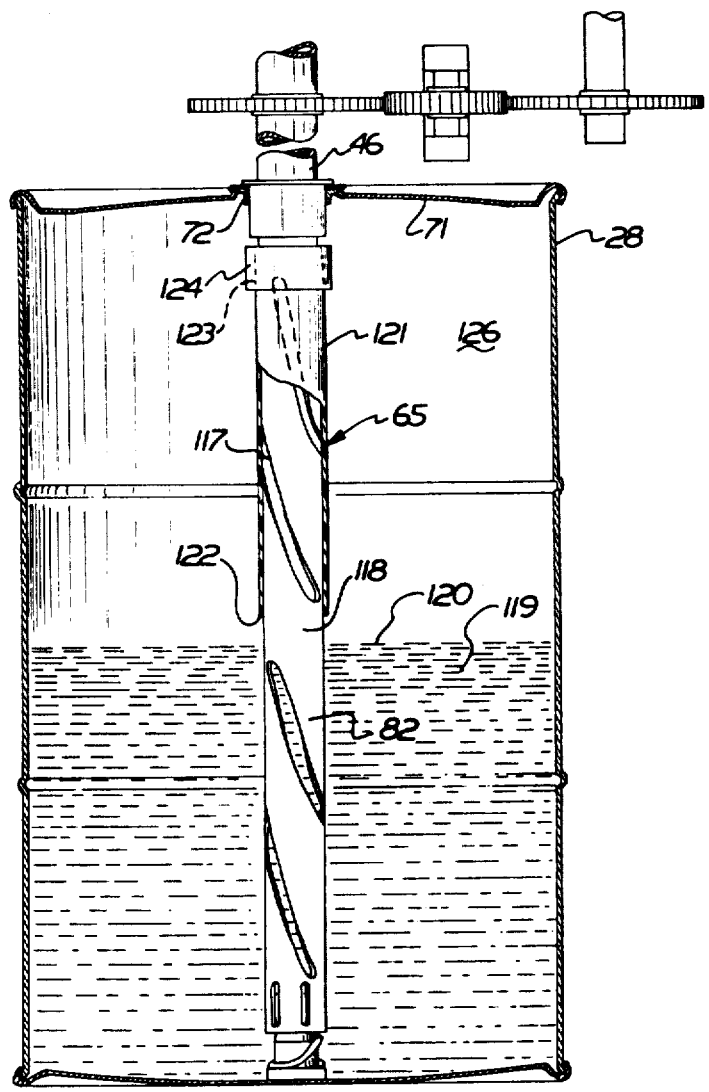
FIG. 3 is a side elevation, partially in longitudinal section, of a drum at the filling station after the waste feed nozzle and mixer drive are connected to the drum and illustrating the mixer structure provided in the drum.
Figure 4:
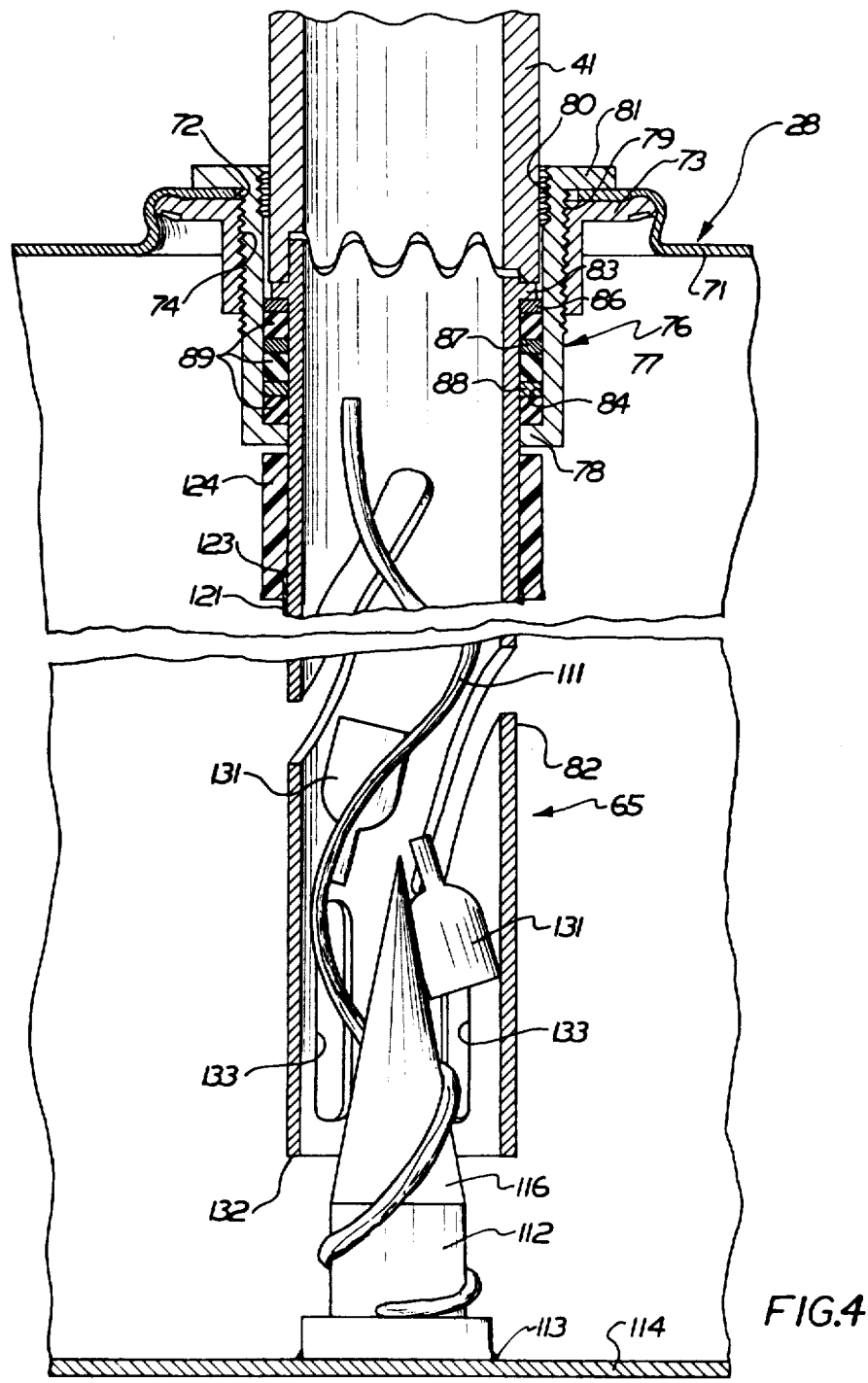
FIG. 4 is an enlarged, fragmentary, longitudinal section of the mixer, its mounting within the drum, its drive, and the frangible ampoules of catalyst.

The mixer apparatus 65 and its drive and mounting of the apparatus in the drum are best illustrated in FIGS. 3 through 5. The illustrated drum 28 is essentially a conventional 55-gallon barrel modified in certain respects for use in the present process. Such drum is provided with an upper end wall 71 having a central aperture 72 therein. Mounted in the aperture 72 is a mounting collar 73 which seals with the end wall 71 around the aperture 72 and is provided with an internal thread at 74. Such collar 73 and its mounting are more fully described in U.S. Pat. No. 4,135,639 (assigned to the assignee of the present invention). A cup-shaped bearing ring 76 is mounted in the collar 73 and provides a depending cylindrical wall portion 77 extending down into the drum 28 to an inturned shoulder 78. The exterior surface of the cylindrical portion 77 is provided with threads 79 which engages the internal threads 74 of the collar 73 to secure the bearing ring in place. An external flange is provided at the upper end of the cylindrical portion 77 and bears against the upper side of the mounting collar 73 when the bearing ring is tightened into position. Suitable gasket means (not illustrated) are provided between the external flange 81 and the mounting ring 73 to ensure that a pressuretight joint is provided.

Extending downwardly through the bearing ring 76 is a mixer or conduit tube 82, which fits within the inturned shoulder 78 with a relatively close fit. An external flange 83 is provided on the tube a small distance from the upper end thereof, and extends out into close proximity with the inner surface 84 of the cylindrical wall portion 77. Located between the flange 83 and the shoulder 78 are a plurality of metal bearing rings 86, 87, and 88. Such rings are sized to closely fit the outside of the tube 82 and closely fit the inner wall 84 of the bearing ring, but are free to move axially with respect to both. Positioned between the rings and between the ring 88 and the shoulder 78 are a plurality of resilient gaskets 89 formed of closed cell foam plastic. These gaskets 89 perform two functions: first, they provide a fluidtight joint between the bearing ring 76 and the tube 82; and second, they are axially compressible to allow limited freedom for the tube 82 to move axially downwardly with respect to the drum when it is engaged by the lower end of the drive nozzle 41. This ensures that damaging loads will not be imposed on either the drive nozzle 41 or the tube 82 when they are coupled together as illustrated in FIG. 4.

The upper end of the tube 82 and the lower end of the drive nozzle 41 are provided with a drive connection and seal structure, best illustrated in FIG. 5. The upper end of the tube 82, above the external flange 83, is provided with a plurality of symmetrically located, axially extending teeth 96. Between the teeth 96 and the flange 83 is a short full wall portion 97. At the junction between the wall portion 97 and the flange 83 is a resilient seal 98, which may be formed of any suitable elastomeric material. Such seal has a generally triangularshaped cross section to provide an outer, generally conical sealing surface.

The lower end of the drive nozzle 41 is provided with a radial end face 99 extending inwardly from the outer surface of the drive nozzle 41 to a conical sealing surface 101, which is proportioned to engage the resilient seal 98 when the nozzle 41 and tube 82 are moved axially together to their coupled position, illustrated in FIG. 4, in which the end face 99 engages the flange 83. Although elastomers are not suitable for long-term sealing in an environment of high radioactivity, such seal only functions for a short time and, in such instance, an elastomer is satisfactory.

Extending upward from the sealing surface 101 is an inner cylindrical wall surface 102 sized to fit down along the exterior of the teeth 96 and full wall portion 97 with a relatively close fit. Such wall extends upwardly to drive teeth 103 projections proportioned to mate with the teeth 96 on the tube 82 to provide a rotary drive connection between the drive nozzle 41 and the tube 82. The various elements are proportioned to ensure that full contact is obtained between the conical surface 101 and the seal 98 to ensure that waste does not escape during the waste feeding operation but is, instead, channeled down into the mixer tube 82. The bearing ring 76 is provided with internal threads 80 so that the entire drum can be sealed by a cap (not illustrated). Preferably, the upper end of the mixer tube 82 is recessed below the thread 80 so that a typical cap can be used.

Referring now to FIGS. 3 and 4, the mixer 65 itself includes stationary components and the rotating tube 82. As best illustrated in FIG. 4, the nonrotating portions of the mixer includes a nonrotating, helix member 111 which is secured at its lower end to a mounting block 112, which is in turn welded at 113 to the bottom wall 114 of the drum 28. The helix member 111 may be welded or otherwise suitably connected to the mounting block 112. Mounted on the upper side of the mounting block 112 and extending into the lower end of the tube 82 is a cone 116. The free end of the helix member 111 extends up along the tube 82 to an upper end preferably located substantially adjacent to the upper end of the tube. The helix member may be formed of any suitable material, such as rod steel. The helix member may have a substantially uniform helix lead thoughout its length, or can be provided with a varying helix lead, as desired.

The tube 82 is formed with a plurality of helical openings 117 extending longitudinally along the length thereof. Such openings 117 are preferably provided with a relatively long lead, and it is preferable to symmetrically locate a plurality of such openings around the periphery of the tube. The openings 117 are interrupted at one or more locations along their length to provide an imperforate tube portion 118 at least at one location along the length of the tube. Such imperforate portion 118 provides an intermediate tie between the portions of the tube remaining after the openings 117 are cut to strengthen the tube and prevent undue weakening by the opening 117. In FIG. 3, only one such imperforate portion is illustrated, and such portion is located to extend across the upper or free surface of the solidifying resin mixture 119 located within a precharged or pre-prepared drum.

Shrink-fitted around the tube 82 is a plastic sleeve 121 formed of a closed cell, polystyrene foam material. The lower end of such sleeve 121 extends to a location at 122 beyond the upper edge of the imperforate section 118. The upper end of the sleeve 121 extends to a location 123 substantially adjacent to but spaced a small distance from the upper ends of the opening 117. Located over the upper end 123 of the sleeve is a second foam sleeve 124. In this instance, the sleeve is formed of an open cell foam material, such as polyurethane material. The sleeve 124 extends from its lower end, where it overlaps the sleeve 121, to an upper end at least above the upper end of the openings 117.

The two sleeves 121 and 124 cooperate to close the openings 117 above the surface 120 and cooperate with imperforate section 118 to ensure that dry particulate waste material entering the drum through the drive nozzle 41 is confined to the interior of the tube and cannot reach the zone 126 within the drum above the surface 120 and surrounding the mixer tube 82. The upper sleeve, however, because of its porosity, provides a vent through which air can pass from the zone 126 during the filling operation. However, the pores of the sleeve 124 are sufficiently small to prevent any particles from passing outwardly through the sleeve into the zone 126.

During the drum preparation which occurs in the safe side 10, the solidifying material is placed in the drum prior to the installation of the mixer. As discussed in greater detail below, a component of the solidifying agent or material, i.e., a catalyst in the case of the illustrated polymer resin, is isolated from the remaining components or portion of the solidifying agent. Such catalyst is contained within a plurality of frangible ampoules 131, illustrated in FIG. 4.

The amount of material added to the drum is selected so that after the mixer is installed, the surface 120 of the solidifying material is located above the lower end of one of the imperforate sections 118, but below the lower end 122 of the sleeve 121. After the proper amount of solidifying material is placed in the drum, the mixer tube 82, with the sleeves mounted thereon, is installed in the drum so that it extends down along and around the helix member 111, as illustrated.

When the mixer 82 is installed, its lower end 132 is spaced upwardly a small distance from the base of the cone 116. Thereafter, the proper number of frangible ampoules 131, containing the necessary amount of hardening catalyst, are placed in the drum and positioned within the mixing tube 82. Preferably, the ampoules 131 are formed of glass or the like to isolate the catalyst from the remaining portion of the solidifying material during the storage of the prepared drum prior to the filling operation. The ampoules 131 are sized so that they cannot exit the tube through the openings 117, and cannot pass down through the lower end of the tube through the clearance between the lower end 132 and the upper or apex portion. The ampoules are fractured for distribution of the catalyst throughout the mixture when the mixing tube is rotated by the drive nozzle 46.

In a preferred form, the apex portion of the cone 116 is inserted into the lower end 132 or bottom portion of the mixer tube and coaxially positioned therein in noncontiguous or noncontacting relationship with the tube to define an annular aperture through which the broken or crushed ampoules can exit the tube. As illustrated in FIG. 4, the ampoules are dimensioned such that they are crushed as they are driven downward into a downwardly tapered channel between the inner tube wall and the apex portion of the cone. Such crushing is preferably accomplished by the walls of the tube, the cone surface, and the interposed lower portions of the helix fixed relative to the base of the cone.

In order to ensure fracture of the ampoules 131 to release the catalyst, a plurality of axially extending slots 133 are provided in the lower end of the tube adjacent to the cone to provide impacting forces which operate to break the ampoules to release the catalyst at the desired point in the filling cycle. Further, the sidewall apertures or slots 133, in addition to aiding in ampoule crush, also provide additional exit passages for crushed ampoule portions which also can exit via the annular aperture at the bottom of the tube spaced from the cone, as noted above. It is also noted that preferably the cone is not truncated, since the sharp cone tip aids in forcing the downward moving ampoules into the tapered crushing channel. However, a slightly truncated cone structure may be acceptable.

FIGS. 6 and 6a illustrate one embodiment of the torque sensing drive 42 which is structured to remotely locate the torque sensing load cell on the safe side 10 of the shield wall 12. In such embodiment, the drive gear 46 is connected to the driven gear 47 through the idler gear 48, which is mounted for limited movement in a direction substantially perpendicular to a plane containing the axes of the two gears 46 and 47. In the illustrated embodiment of FIG. 6, the idler gear is journaled on a shaft 136 supported at its ends on a yoke 137 at one end of a drag link 138. The opposite end of the drag link 138 is pivotally connected to a lateral or pivot bar 139, which is pivoted adjacent to the shield wall 12 on a pivot pin 141 and extends through an opening 142 in the shield wall 12. Located on the safe side of the shield wall 12 is a load cell 143 providing a strain gauge 144 operable to establish an electrical signal having a value proportional to the force applied to the load cell by the inner end 146 of the pivot bar 139. A radiation shield 147 is removably mounted over the load cell and over the inner end of the bar. Such shield may be formed, for example, of lead or the like to prevent any escape of dangerous radiation through the opening 142 into the safe side area 10.

Preferably, the members 138, 139, and 141 function as a motion transfer mechanism (with minimum frictional loss) connected between the axis of rotation of the idler gear 48, undergoing a lateral type torque-induced shear force, and the strain gage load cell 143. It can be seen that the illustration motion transfer mechanism is a first class lever configuration which also functions as a force multiplier between the idler gear and the load cell, the distance between the fulcrum point (provided by pin 141) and the end of the pivot bar 139 connected to the drag link 138 being substantially greater than the pivot bar length between the load cell 143 and the fulcrum. Such a mechanism desirably matches the linear movement range of the idler gear axis with that of the selected strain gage.

Referring again to FIG. 6, when the drive 42 is operated to turn the drive nozzle 41, and, in turn, to rotate the mixer tube 82, torque is transmitted to the idler gear. When the rotation is in the direction indicated by the arrows in FIG. 6, the torque transmitted to the idler gear 48 produces a force on the idler gear in the direction of the arrow 148. The magnitude of such force is a direct function of the torque being transmitted to the idler gear by the drive system. Therefore, whenever the torque required to drive the mixing tube increases, the force in the direction 148 increases as a direct function, and if the torque transmitted by the drive decreases, the magnitude of the force in the direction 148 correspondingly decreases.

The torque-induced force is transmitted to the drag link 138 to the pivot bar 139, and in turn causes the force on the load cell 143 which is a function of the torque transmitted by the gear drive. The strain gauge causes an electrical signal, which is in turn a function of the force applied to it by the inner end 146 of the pivot bar and which is, therefore, a function of the torque being transmitted through the drive. This torque signal established by the load cell is used to monitor the operation of the system in a manner discussed in greater detail below. By locating the load cell 143 on the safe side of the shield wall 12, service can be performed on the torque sensing system if and when required by merely removing the shield 147 to provide access to the cell. During such repair work, the feed system is normally clear and there is substantially no danger of harmful radiation exposure. However, during normal operation, the shield 147 is in place to protect the personnel working on the safe side of the shield wall 12.

A second embodiment of torque drive is illustrated in FIG. 7. In this embodiment, the torque sensor is located on the radioactive side where it is not readily accessible. However, this embodiment has the advantage of eliminating any friction-induced errors in the torque load signal. In this embodiment, the idler gear is journaled on a tubular pivot shaft 151 having strain gauges 152 (preferably electrically connected in a conventional multi-legged bridge configuration) mounted on the interior thereof (and preferably embedded therein) which measure the strain of torque-induced shear-type force applied to the pivot shaft. Such strain gauges produce an electrical signal which is a direct function of the torque being transmitted through the drive system. Lead wires 153 extend from the end of the shaft 151 and are connected through the shield wall 12 to the safe side controls of the system via the aperture or opening 142 to permit monitoring of torque at a location separate from the idler gear by the shield structure 147. In both embodiments, the drive nozzle is preferably connected to the driven gear 47 by an axial spline which allows limited relative axial movement therebetween so that axial forces are not applied to the driven gear. Further, the driven gear is preferably supported on rotary bearings within a housing which encloses all of the gearing. Such spline connection, bearings, and housing are not illustrated in order to simplify the drawings.

Figure 8:
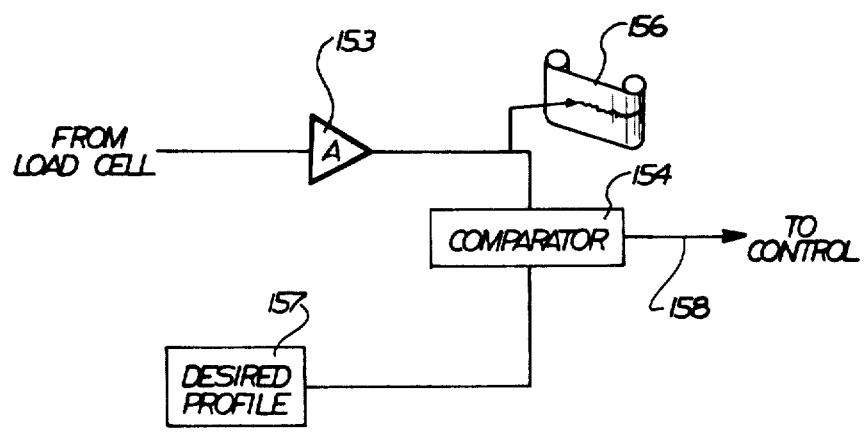
FIG. 8 is a block diagram of the electronic components of the torque sensing control system.

Referring to FIG. 8, the signal from the load cell of either embodiment (FIGS. 6 and 7) is supplied to an amplifier 153, and from the amplifier to a comparator 154. Such signal can also be supplied to a recording graph instrument 156, where a permanent profile graph is recorded. This graph or profile of the torque being transmitted through the gear drive as a function of time allows the operating personnel to visually monitor the filling cycle during which the radioactive waste is added to the drum and mixed with the solidifying material. In an automated system, the comparator 154 is supplied with a desired profile from, for example, a computer memory 157 or the like so that the comparator can establish automatically whether the profile of torque developed during any given filling cycle is within the desired operating characteristics and to automatically produce an output signal schematically illustrated by the line 158 for the automated control of the filling operation.

The dry product valve 36 is best illustrated in FIGS. 10–13. Such valve includes a housing consisting of a lower housing member 161 and a removable housing cover 162. The two members 161 and 162 are preferably bolted together by flange bolts 163 and cooperate to define a fluidtight valve cavity 164 in which the operative parts of the valve are located.

The principal components of the valve include a pair of opposed and spaced valve plates 166 and 167, and a movable valve member 168 positioned therebetween. The lower valve plate is provided with upper valving surfaces 169 and a passage 171 open to such valving surface. The passage 171 connects with the outlet conduit 172 of the valve, which in the illustrated embodiment is integrally formed with the plate.

The upper valve plate 167 is also formed with a valve surface 173 and a through passage 174 open to the surface 173.

The movable valve member 168 is provided with a lower valve surface 175 mating with the valve surface 169 of the lower plate 166 and an upper valve surface 176 mating with the valve surface 173 of the upper plate 167. Here again, the valve member 168 is provided with a through passage 177 open to its two valving surfaces 175 and 176. When the valve is in the open position, the passage 177 is aligned with the passages 171 and 174, and the three passages provide a through conduit for the flow of waste particulate matter. All of the valve surfaces are accurately ground and lapped to provide sealing mating engagement and springs, diagrammatically represented at 178, resiliently bias the upper plate 167 toward the lower plate 166 to maintain the various valving surfaces in contact without clearance.

Figure 12:
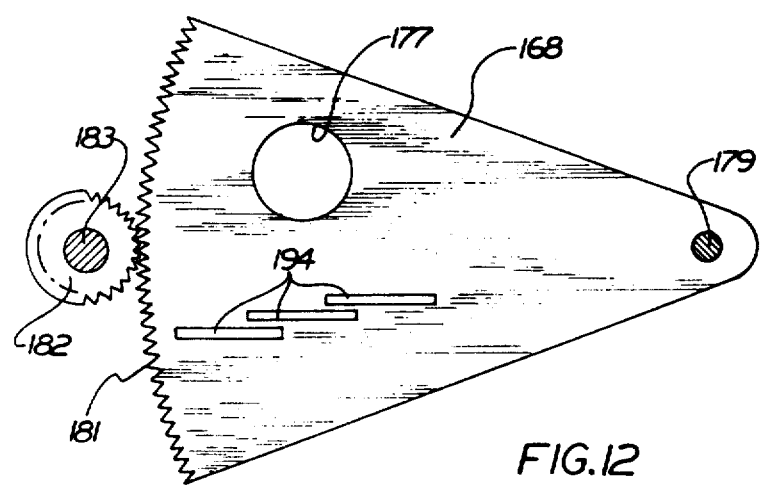
FIG. 12 is a fragmentary plan view of the movable valve member of the valve illustrated in FIGS. 10 and 11.

The movable valve member 168 is pivoted by a pivot pin 179 on the lower housing member 161 for arcuate movement between the open position illustrated and the valve-closed position. Sufficient clearance is provided in the pivot 179 to allow the movable valve member to correctly align itself for full mating engagement with the two plates. The movable valve member is shaped as best illustrated in FIG. 12 and is provided with gear teeth 181 which mesh with a pinion gear 182 mounted on the end of a rotary shaft 183 which extends out through the cover member 162 to the valve drive system (not shown).

The downcomer 34 through which the radioactive waste enters the valve extends through the cover 36 and into the passage 174 in the upper plate 167 with a close fit. However, sufficient clearance is provided to allow the upper plate to properly align itself against the movable valve member for mating engagement therewith. A bellows-type seal 186 is provided to seal the joint between the downcomer 34 and the upper valve plate 167. Such bellows seal positively prevents any leakage therebetween while still permitting limited relative movement caused, for example, by thermal expansion or contraction in the system. Similarly, a nondynamic or static seal is provided by another bellows 187 between the cover member 162 and the downcomer 34. Here again, such type of seal allows limited relative movement while still providing what amounts to a static seal that prevents all leakage therebetween. Since the outlet conduit 172 of the valve does not have to freely move with respect to the housing, a gland-type packing 195 is provided for the static seal between the conduit and the lower housing member.

A bellows 188 mounted on the cover 162 supports a face seal 189 engaging a flange 191 on the shaft 183 to prevent leakage from the chamber 164, while permitting relative rotation. The pressure line 58 connects to the chamber 164 to maintain the chamber at a pressure higher than the pressure within the downcomer 34, at least during the opening and closing of the valve, and to supply purging pressure to minimize a tendency for any of the radioactive waste materials to exist in the valve structure when it is closed.

Figure 11:
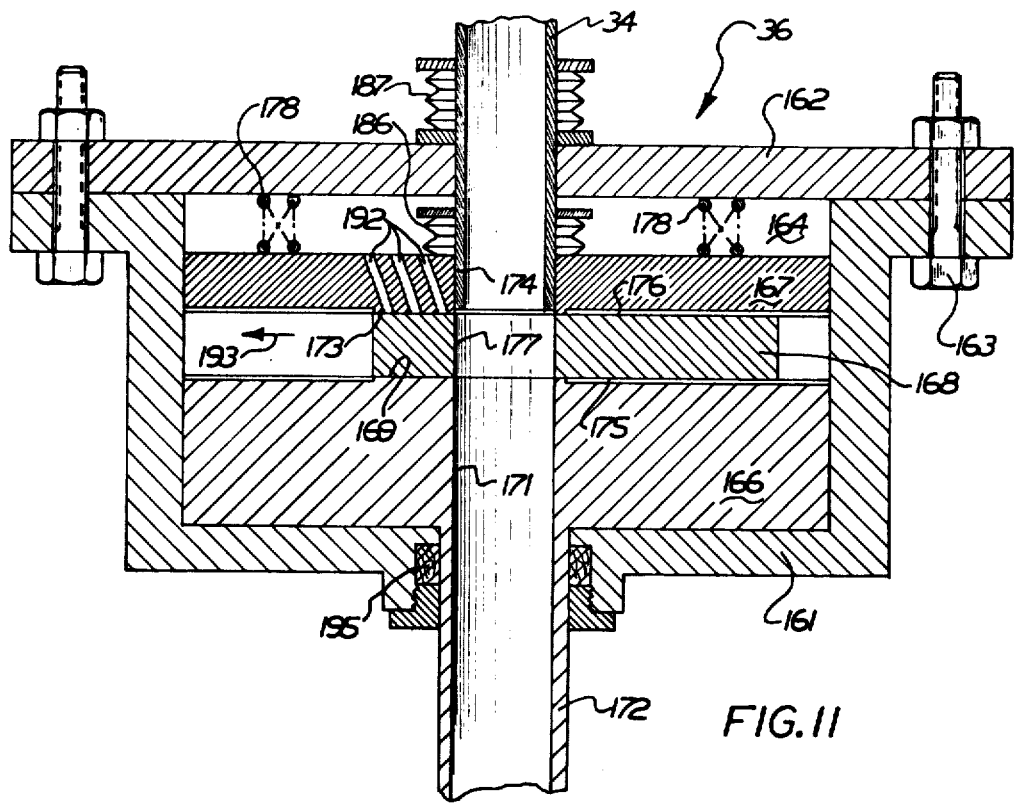
FIG. 11 is a cross section taken along line 11—11 of FIG. 10, further illustrating the valve structure.
Figure 13:
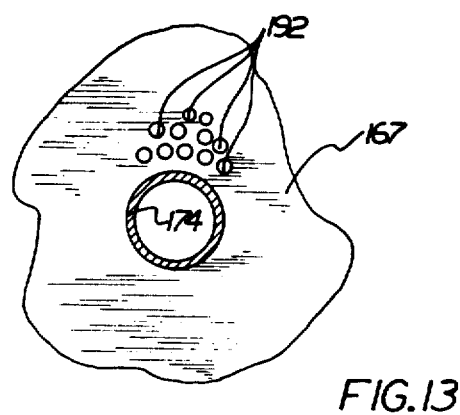
FIG. 13 is a fragmentary plan view of one of the valve plates illustrating the pattern of purging openings formed therein.

As best illustrated in FIGS. 11 and 13, the upper plate 167 is provided with a plurality of inclined passages 192 which are normally closed by the movable valve member when the valve is open and which are progressively opened as the valve member is moved to the valve-closed position in which the passage 177 is displaced from the two passages 171 and 174. These passages are open at their upper ends to the pressurized chamber 164. As the movable valve member 168 is pivoted in the direction of the arrow 193 from the fully open position illustrated toward the fully closed position, the passage 177 is displaced to the left as viewed in FIG. 11, uncovering a first group of inclined passages 192 which allows purge air to blow into the passage 177 of the movable valve member to commence the purging of any radioactive particulate from such passage. The inclined passages 192 are preferably arranged in an array substantially as illustrated in FIG. 13 so that initially a relatively large number of inclined passages are open to create a relatively large amount of purge air flow, and so that as the movable valve member moves to its fully closed position, the purging flow continues but is decreased somewhat until the valve is fully closed. Preferably, the valve members are sized so that when the valve is fully closed, the passage 177 of the movable valve member is displaced past the purging passages so that the purging passages, as well as the main valve passages, are closed.

It is important to provide dependable operation of the valve for extended periods of time without any material service needs. It is therefore contemplated that lubricating material, such as compositions containing graphite, are mounted in slots 194 formed in the face of the movable valve member to provide continuing lubrication and reduce the tendency for wear to occur.

Since contamination control is of utmost importance in the present system, it is important to provide the valving mechanism within a pressurized environment so that any leakage which might occur is into the waste feed system rather than out of such system. Therefore, at least during valve operation, the chamber 164 is pressurized to a pressure higher than the pressure in the waste feed system.

As discussed in greater detail below, the valve 36 is not normally operated during actual waste feed, so it does not have to interrupt the flow of waste in a normal operation of the system. Therefore, wear of the valving surfaces created by the presence of particulate matter is not a particularly serious problem. The purging system tends to ensure that particulate material is cleared away to reduce wear, as well as to minimize a tendency for the valve to become contaminated. The valve is capable, however, of operating to interrupt radioactive waste flow if an emergency condition occurs which requires its operation.

Figure 14:
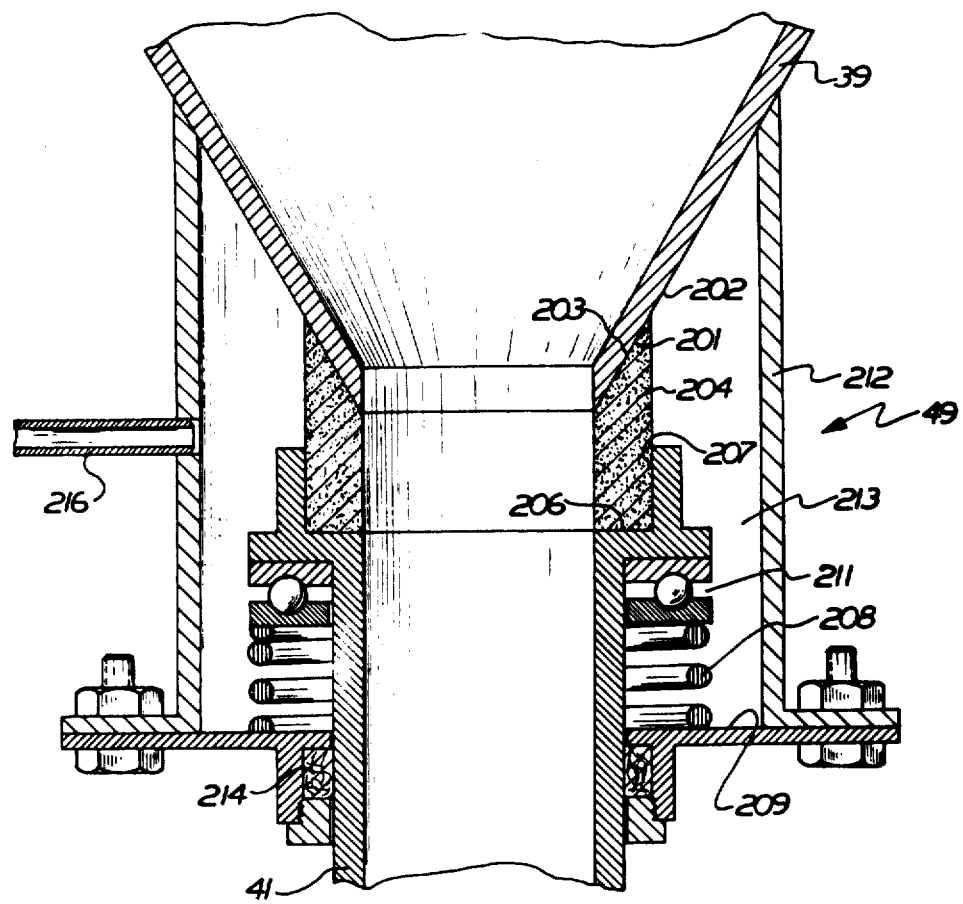
FIG. 14 is an enlarged, fragmentary side elevation in longitudinal section of the waste feed system illustrating the dynamic seal provided between the nonrotating portions of such system and the rotating drive nozzle.

The structure of the dynamic seal 49 provided between the purge chamber 39 and the drive nozzle 41 is illustrated in FIG. 14. Such seal must accommodate the relative rotation between the drive nozzle and the purge hopper. Since such seal is directly involved in the waste feed path, it is a critical seal in the system and must work for an extended period of time with complete reliabiity to prevent contamination or the like. The dynamic seal is provided at an interface 201 between the conical exterior surface 202 of the purge chamber and a mating conical surface 203 formed on a block of low friction and long-lasting seal material 204. Such material may be, for example, a block of compacted graphite. The block of sealing material 204 is secured in a pocket in the upper end of the drive nozzle formed by a shoulder 206 and an upstanding cylindrical skirt 207. A spring system resiliently biases the two surfaces 202 and 203 into mating and sealing engagement. Such system includes a spring 208 which extends between a housing shoulder 209 and a thrust bearing 211.

The shoulder 209 cooperates with a cylindrical housing 212 to define a pressure chamber 213 enclosing the dynamic seal. A suitable rotary seal 214, which may be a face seal or packing gland, is provided between the outer surface of the drive nozzle 41 and the housing shoulder 209. Such seal is not as critical because it does not actually confine the waste stream, but merely provides a seal sufficient to allow pressure to be maintained within the pressure chamber 213. A pressure line 216 opens to the chamber 213 to supply air under pressure from the line 58 to such chamber.

By maintaining the pressure in the chamber 213 at a pressure higher than the pressure within the waste feed system, any leakage which might occur across the interface at 201 will be from the chamber 213 into the waste feed path. This ensures that contamination will not occur in the area of the dynamic seal 49.

The hat valve or cap type conduit closure 51 and its support or control arm 52 are illustrated in FIG. 15. Such valve is provided with a surface of revolution 221 which is engageable with the circular edge 222 at the intersection of the conical sealing surface 101 and the end face 99, best illustrated in FIG. 5. Referring again to FIG. 15, the valve itself is supported with a ball and socket joint 223 on the arm 52 so that it has full pivotal freedom to properly seat against the end of the drive nozzle 41 and seal therewith. As discussed in detal below, the hat valve 51 is closed during the purging operation to ensure that contaminating waste is not released from the waste feed system and is opened against differential pressure to create immediate purging when the feed system is ready for waste feed. Means are provided to cause the valve (and the adjacent conduit or nozzle 41) to vibrate to some extent as it closes (due in part to suction forces) and as it opens so as to shake loose any particulate matter from the interior wall of the nozzle 41 which might be present for final purging. In the illustrated embodiment, the hat valve 51 is provided with an eccentric mass or weight 224 so that as the hat valve approaches the drive nozzle, it is not in position for full seating, and must therefore be pivoted to the proper feeding position by initial limited contact with the drive nozzle at only one point on the circular end of the nozzle. This action tends to cause vibration, which tends to loosen any particles not previously purged from the feed system prior to the full closing of the valve so that more complete purging occurs. Similarly, as the valve commences to open, the presence of the eccentric mass tends to cause the valve to tip with respect to the feed, producing vibration, which tends to loosen any particles which might be present so that they are entrained in the purging air which commences to flow as the valve begins to open. The vibrating action is caused at least in part by unequal fluid or air flow rates between the cap structure 51 and the conduit end at at least two points spaced apart at the interface area of such elements. Preferably, the cap 51 is formed of metal to provide a metal-to-metal seal with the nozzle end for long-term operation.

The full process in accordance with this invention is best understood by reference to FIGS. 1 and 2. The drum preparation, consisting of four separate steps, is performed on the safe side 10 of the shielded wall where the operating personnel can work directly on the drum without encountering dangerous radioactive radiation. In the first step indicated in the flow diagram of FIG. 1, the drum is inspected. At the inspection, the drum is also numbered so that it can be identified at any subsequent time.

During the manufacture of the drum, and prior to the inspection, the mounting collar 73 is mounted in the center of the end wall and the mounting block 112 and the helix 111 are installed. Further, in most instances, the bearing ring and the cap which threads into the internal threads 80, are installed prior to the inspection. During or after inspection, the cap is removed, as indicated, at an uncapping station at 232. The next step of the drum preparation involves the metering of the solidifying material into the drum, as indicated at position 233. As discussed above, all of the components of the solidifying material system except the hardener or catalyst is placed within the drum at this point in the cycle. Prior to filling, the bearing ring 76 and mixer tube 82 are preferably removed so that the solidifying agent does not prematurely contact the polystyrene sleeve 121. After filling, the mixing tube 82 is installed, and a plurality of frangible ampoules containing the hardening catalyst are placed within the tube, as indicated by the location 235 in FIG. 1. At this point, all of the components of the solidification agent are in the drum, but the catalyst is segregated from the remaining components of the solidification agent and accelerated polymerization does not commence. The final step in the preparation of the drum involves the reinstallation of the cap which seals the drum at the recapping location 234.

Normally, a number of drums are prepared prior to the commencement of the filling of any of them with waste. For example, if three drums are expected to be filled during a given day of operation, three drums are usually prepared before the commencement of the filling of any of them. Because the catalyst is segregated from the remaining components of the solidification material, the prepared drums can be stored for a reasonable period of time without danger of premature polymerization.

The crane 14 is then used to transfer a prepared drum to one of the staging platforms 236 or 237 or, in some instances, directly to the loading station 23a of the drumming station. In either event, the operations within the drumming station 18 are as follows.

The waste feed valve is verified closed. Then, the hatch 27 is opened and the drum support 22 is moved to the receiving position 23 and then raised so that a drum can be lowered through the hatch opening until it is supported by the drum support 22 in the receiving position 23. After the drum is properly positioned on the drum support 22, it is released by the crane 14 and the drum support 22 is lowered to the position illustrated in phantom in FIG. 2. The drum support 22 is then moved to the uncapping and capping position 24, as illustrated in full line in FIG. 2 and as represented at 24a in FIG.

1. In such position, the drum is aligned below the capper 29 and is clear of the hatch 27 so that the hatch may be closed to seal the pressure vessel 21.

The drum 22 is then raised vertically up toward the capper to the uncapping position, and the capper is extended so that a collet gripper provided by the capper can engage the cap in the drum. The collet (not illustrated) is then operated to engage and grip the cap so that it may be removed. Preferably, the capper incorporates signal means which establish that proper gripping of the cap has been accomplished. The cap is then screwed out of the drum and is retracted while continuing to grip the cap. The successful uncapping operation is monitored by the sensor that establishes that the cap continues to be gripped as the capper retracts.

The drum support 22 is then lowered back to the full line position of FIG. 2, and is moved horizontally to the filling position 26, illustrated in phantom. In such position, the prepared drum is positioned immediately below the waste feed system. In order to establish conditions for a purging operation before the hat valve 51 is opened, the valve 54 is opened to pressurize the pressure vessel and the valve 61 is opened, so that purging flow can commence the instant the hat valve 51 is opened. The differential in pressure between the pressure within the purge chamber 39 and the pressure vessel 21 is monitored by the differential pressure sensor 62.

When the pressure in the pressure vessel exceeds the pressure within the purge chamber 31 by the desired differential pressure, the hat valve 51 is slowly opened, causing it to chatter or vibrate as it opens, to shake loose any particulate matter which may exist in the feed system. Simultaneously, purging flow commences, due to the differential pressure carrying any loose particulate matter which may exist with it into the purge chamber 39 and therefrom through the valve 61. The air passing through the valve 61 is filtered to ensure that no particulate matter escapes into the atmosphere.

When the hat valve 51 is retracted completely clear of the fill station, the purging operation continues and, if necessary, to prevent excessive differential pressures to be applied to the drum, the differential pressure between the purge chamber 39 and the pressure vessel 21 is adjusted to a value which will not produce collapse of the drum when the drum becomes sealed with the drive nozzle 41.

The platform 22 is then fully raised up toward the lower end of the drive nozzle. If any small amount of misalignment exists between the drive nozzle 41 and the upper end of the mixing tube 82, the conical sealing surface 101 will cam the drum into proper alignment for meshing engagement between the upper end of the mixing tube 82 and the lower end of the drive nozzle. The upward movement continues until the elements assume the position illustrated in FIG. 4, in which the seal 98 is engaged by the conical surface 101 to make a fluidtight joint between the drum and the lower end of the drive nozzle 41.

Verification of the proper sealing between the drive nozzle and the drum is established by then operating the valves 54 and 61 to establish a desired known differential pressure therebetween as recorded by the differential pressure sensor 62. When proper differential pressure is established, both of the valves 54 and 61 are closed, and the differential pressure is monitored. If the differential pressure does not continue to exist, it is a positive indication that a seal has not been established between the drive nozzle and the drum, or that some other leakage condition exists which would be detrimental to the continuation of the process. If the differential pressure continues to exist in a proper manner, however, verification of the seal between the drum and the waste feed system is established and the process is allowed to proceed.

If the dry particulate feed system which supplies the waste material to the downcomer 32 is maintained at atmospheric pressure, the valve 61 is then opened to ensure that the pressure across the dry particulate valve is equalized. The pressure within the pressure vessel 21, however, is maintained at a pressure higher than atmospheric pressure to ensure that during the waste feeding operation, there will be no leakage of the waste material into the pressure vessel 21. The pressure in the pressure vessel surrounding the drum, however, must not exceed the pressure within the waste feed system and within the drum by an amount which could cause drum damage or collapse.

Figure 10:
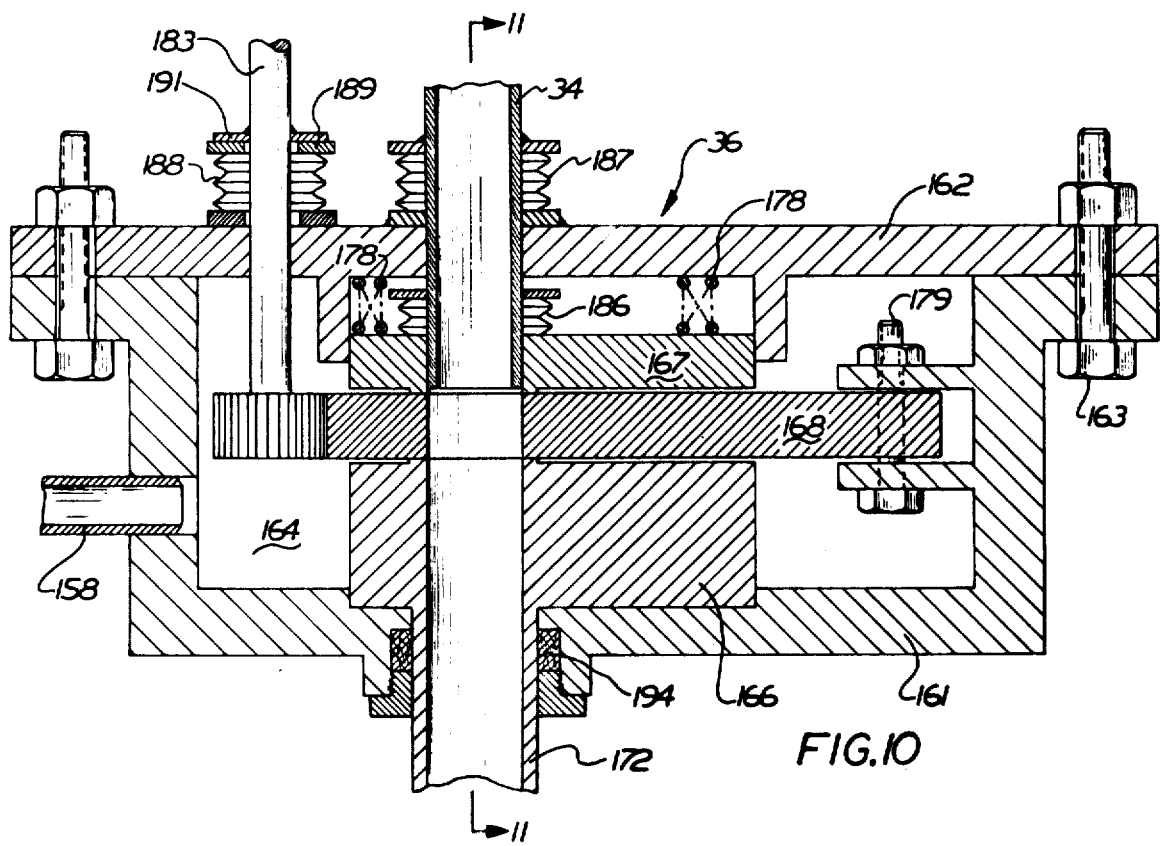
FIG. 10 is a schematic cross section of a preferred control valve for controlling the flow of dry particulate radioactive material.

In instances in which the feed system supplying the waste to the downcomer 34 differs from atmospheric pressure, for example, is maintained at pressures above atmospheric pressure, the valve 61 is closed and means are provided to equalize the pressure across the dry product valve and the pressure surrounding the drum within the pressure vessel is adjusted to a pressure above the pressure of the downcomer system by an appropriate differential pressure sufficient to ensure that waste feed cannot leak out into the chamber but low enough to again prevent any possibility of drum collapse. It should be noted that at this time the chamber 164 illustrated in FIGS. 10 and 11 is pressurized to a pressure higher than the pressure within the waste feed system. Also, the pressure within the chamber 213, illustrated in FIG. 14, is maintained at a value higher than the pressure within the waste feed system.

Figure 9:
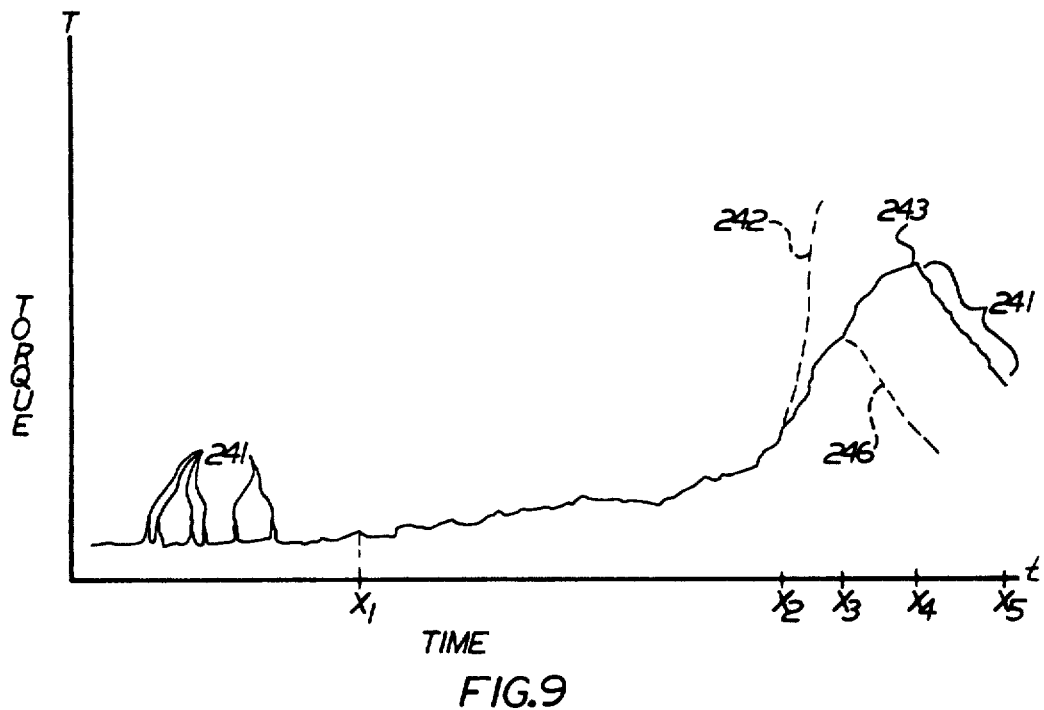
FIG. 9 is a representative graph plotting mixer torque vs. time in a typical drum filling and mixing cycle.

After verification of the seal and after the various differential pressures are established, the process can proceed. The gear drive 42 of the drive nozzle 41 is then actuated to commence rotation of the mixer tube 82. The proper operation of the mixer is monitored by the torque sensing means of the drive. Verification of proper operation is established by the sensing of the torque transmitted through the drive 42, as mentioned above. The recorder 156 commences to plot a graph at the time the mixer is started. Verification that the ampoules are properly broken to release the catalyst into the remaining solidifying material is established by a series of spikes or torque signal impulses 241 in the graph, as illustrated in FIG. 9. Such spikes result from the momentarily increased torque required to break the various ampoules, and such spikes appear as momentary but discernible torque variations in the graph. In practice, a number of separate ampoules are inserted into the drum during the drum charging operation. By counting the number of spikes as they occur, it is verified that sufficient catalyst is released into the solidification material to cause proper polymerization before the waste feeding is actually begun.

After catalyst release is verified, the dry product valve is then opened by rotating the shaft 183 to move the movable valve member 168 to the valve-open position. After it is established that the dry product valve is open by suitable sensors (not illustrated), a waste feed auger (not illustrated) of the supply system is started and waste commences to gravity feed into the drum.

Figure 4A:
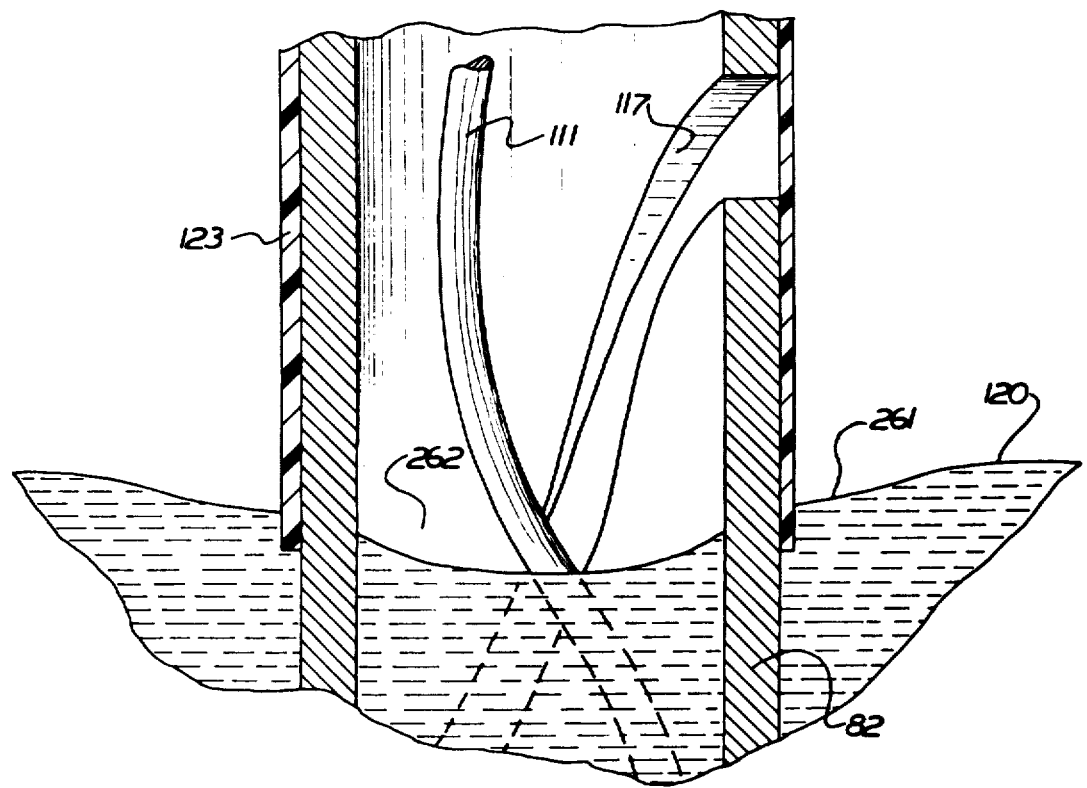
FIG. 4a is an enlarged, fragmentary section of the mixer at the surface of the solidification agent illustrating the internal and external vortexes formed in the surface of the solidification agent during the mixing operation.

The mixer is arranged to provide the desired and required mixing operation without high energy input so that the temperature of the solidifying material is not materially increased during the filling operation. This ensures that the completed filling operation will occur prior to the commencement of any material polymerization of the solidification material. The direction of rotation of the mixer tube, the direction of the helix of the stationary helix member, and the direction of the helical openings 117 are arranged so that an outer vortex 261 is established in the surface 120 of the solidification material adjacent to the mixer tube 82 and around the mixer tube, as illustrated in FIG. 4a. An inner vortex 262 is also established in the solidification material within the mixer tube 82. Further, there is a downward flow of the material within the tube toward the open lower end at 132, and an inward flow into the tube through the openings 117 adjacent to the surface. Such flow, however, is not turbulent.

As the dry particulate waste material is fed into the downcomer 34, it drops through the open valve 36, the vertical conduit 37, the drive nozzle 41, and into the mixer tube. Such material, however, is confined to the zone within the tube by the two sleeves 121 and 124, and cannot pass into the outer zone 126 of the drum.

The feed rate of the particulate material as controlled by the dry particulate feed system from the volume reduction system 33 is sufficiently slow so that there is no substantial buildup of waste within the mixer tube, and the waste is carried by the inner vortex through the surface of the solidification material and down along the tube substantially as fast as it is fed into the system. However, in the event that any bridging might occur within the tube above the surface of the liquid, the rotation of the mixer tube 82 with respect to the stationary helix 11 breaks up such bridges and ensures continuous flow.

It is an important feature of this invention that the waste material is not allowed to leave the tube except after it is drawn into the liquid solidification material. The sleeve 121 is initially spaced from the surface of the liquid solidification material so that the sleeve does not initially contact the solidification material. The imperforate section 118, however, initially projects below the surface of the liquid solidification material to ensure that no waste can escape into the zone 126 illustrated in FIG. 3.

As the waste material is added to the drum and is mixed into the solidification material, the level of the surface 120 of the mixture of the waste and solidification material slowly rises up in the drum and along the tube 82. The sleeve 121 is formed of a material which slowly dissolves as it is contacted by the liquid solidification material to progressively uncover higher portions of the helical openings 117. However, the sleeve 121 does not dissolve ahead of the surface 120 as it rises along the tube, and the sleeve, therefore, provides a continuing closed conduit extending from the upper end of the mixer tube to the surface of the solidification material to continue to ensure that waste material passes down the tube and does not enter the zone 126. In practice, the sleeve 121 remains intact to a point slightly below the surface of the solidification material, but does not extend any appreciable distance therebeyond and is progressively dissolved away as the filling operation continues, so that a continuing flow of solidification material can proceed inwardly to the outer vortex 261 immediately around the mixing tube and into the tube through the opening 117 so as to provide a continuing supply of liquid solidification material to receive and wet and encapsulate the waste material being fed into the drum. As the drum is filled, air in the zone 126 passes through the porous sleeve 124 and is vented through the purge valve 61.

During the filling operation, the torque sensing drive 42 continues to monitor the filling operation. Referring to FIG. 9, assuming that the flow of waste material into the drum is initiated at a time $X_1$, the torque gradually increases as the depth of material increases, due to the addition of waste material. Also, there is a tendency for the addition of dry waste to cause an increase in the viscosity of the mixed materials. This also results in an increase in the torque required to maintain the operation of the mixer, which is visually illustrated on the graph of FIG. 9. The continued monitoring of the torque is also utilized to establish if proper mixing is not continuing. For example, if the torque requirement increases prematurely and sharply, as indicated by the dotted line 242 at time $X_2$, there is an indication that the mixer is becoming excessively packed by, for example, an excessive feeding rate of the supply system 33.

The normal profile of a graph establishing when proper mixing occurs is as illustrated in full line in FIG. 9, wherein the torque required to drive the mixing tube gradually increases until the drum is properly filled at the point 243 (time $X_4$). At such point, the feed of the waste is terminated and the driving torque required to continue to rotate the mixing tube declines, as indicated by the zone 244. This decline in the required torque results from the continued flow of the solidification material containing a high concentration of waste material down and out of the tube, and the flow of less concentrated mixtures of waste and solidification, liquid into the tube to replace the high concentrate mixture. Since the viscosity of the mixture is a positive function of the concentration of waste within the mixture, this decreasing torque zone 244 produces a positive indication that waste feeding is not continuing.

The dotted line 246 at time $X_3$, representing a premature drop in the torque requirement for the mixer, would indicate that waste feed has prematurely terminated for some reason. By monitoring the torque during the filling operation, it is possible to establish that catalyst release is accomplished, that proper filling and mixing are accomplished, and if an improper profile is encountered, also to establish what type of malfunction is occurring.

Assuming that the profile obtained during a given filling operation indicates that proper filling has been accomplished, the feed of the waste feed system 33 is stopped when the drum is properly filled and the system is allowed to dwell with the mixer continuing to operate to allow it to stabilize and the dustlike waste material to enter the drum and be mixed. After a dwell period, the dry product valve 36 is closed and, as discussed above, is purged during the closing operation.

After still another dwell period, and while the valve 61 remains open to maintain the differential pressure between the pressure vessel 21 and the drive nozzle 41, the drive 42 is shut off at time $X_5$ (see FIG. 9). Again after a pause to allow settling of any material which may exist within the system, the drum platform 22 is lowered to break the seal between the mixer tube and the drive nozzle. Preferably, the drum is lowered until a gap of about one-quarter inch exists between the seal 98 and the conical surface 101. Because of the differential pressure that exists between the purge chamber 39 and the pressure vessel 21, a rush of air immediately occurs, which entrains any remaining particulate material and cleans the waste system. This also results in an equalization of the pressure within the drum and within the pressure vessel. After the initial purge, the drum is further lowered and, while the pressure within the vessel 21 is maintained at a higher pressure than that within the purge chamber 39, the hat valve is moved to the closed position to seal the waste feed system. As discussed above, the hat valve 51 is preferably structured so that it vibrates to some extent as it closes to shake loose any particles which may be on the walls of the drive nozzle to cause them to be purged from the system during the closing operation. A differential pressure is maintained to ensure that any leakage which might exist is into the nozzle.

The drum is then carried by the support platform 22 to the capping position 24 beneath the capper 29. Once properly located, the drum is raised up to the cap receiving position and the capper is lowered to thread the cap into the drum. Proper capping is again sensed by the seating of the cap in the drum.

After the recapping operation, and while the drum is in the raised position, a test is made to determine whether or not the exterior surface of the drum has been contaminated. This is accomplished by opening the vacuum tester 31 to allow flow to an analyzer. The vacuum-type particle sampler provides one or more pickup nozzles adjacent to the drum surface. If there are any particles of waste material on the exterior of the drum, some of such particles are carried by the vacuum to the analyzer, which determines the presence or absence of waste material and provides a direct determination of whether the drum exterior has been contaminated at any time during the process.

If the analyzer determines that the exterior surface of the drum is contaminated, the decontamination wash system is operated to wash the drum and cause the contamination to be removed through a floor drain 251. On the other hand, if contamination does not exist, there is no necessity for decontaminating the drum, and it is lowered to the position 24. The valve 54 is then closed and the valve 57 is opened to bring the pressure vessel to atmospheric pressure. The hatch is then opened and the drum is moved to the receiving and delivery position 23 and represented by 23b in the flow diagram of FIG. 1.

The drum is then raised up by the drum support 22 into the open hatch, where it is picked up by the crane 14 and transported to a verification location 19 in which the drum is weighed to determine the amount of waste material which has been placed in the drum, its radiation level is determined by a radiation sensor, and polymerization is verified by an increase in the temperature of the drum sensed by a suitable temperature sensor. Once it is verified that polymerization is occurring, the crane 14 transports the drum to a storage area, indicated on the flow diagram of FIG. 1 at 252, where it may be stored temporarily or permanently. In most instances, the drums are stored at the filling site for a period of time to allow preliminary decay to occur. The drums are often thereafter moved to a permanent storage location, indicated by the location 253, which may be at a remote site.

The present invention thus far described is particularly suited for the disposal of dry particulate waste; however, in accordance with the broader aspects of this invention, it may also be used to dispose of certain types of liquid waste. In such instances, an emulsion or dispersion of the waste material with the solidification material may be formed, and an appropriately modified mixer is provided which is capable of establishing such emulsion or dispersion. The torque sensing system is used to establish that proper mixing has occurred and that an emulsion or dispersion is properly established. Generally in such systems, a higher energy mixer is required than in the illustrated embodiment. For example, in such system, paddles may be provided on the mixer tube to create sufficient turbulence to establish the required emulsion or dispersion, and the mixer would normally be operated at a higher speed. In fact, with the torque sensing mixing operation of this invention and a high energy mixer, the mixing causes an elevation of the temperature of the mixture and may be used to actually trigger the polymerization. In such apparatus, there is a discernible increase in the torque required for mixing when polymerization commences and the torque sensing system provides a positive indication of polymerization. With such an arrangement, there is no danger of separation occurring prior to polymerization and a good blend of waste and solidification material is assured.

In instances in which dry particulate waste is involved, however, it is not desirable to provide high energy mixing, since the principal requirement is that each particle of waste is merely wetted with solidification material and after polymerization is securely held by the matrix of the solidified material. It is important, however, in the disposal of dry particulate waste to provide a system in which the dustlike waste material cannot be carried by leaks or the like into the environment and in which purging ensures to the maximum extent possible that the system itself does not become contaminated.

The phrases "encapsulation of waste" and "solidification of waste" as used in the specification and claims mean the combination of waste material with a solidification agent to produce, upon curing or setting of the solidification agent, a freestanding body having the waste material substantially entrapped, dispersed, or otherwise included therein.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A valve system for controlling dry particulate radioactive material or the like, comprising a housing defining a pressure chamber and means for pressurizing said chamber, valve means in said chamber providing first and second spaced valve surfaces, a movable valve member providing third and fourth valve surfaces respectively mating and sealing with said first and second valve surfaces, first and second flow passages respectively open through said first and second valve surfaces, a third passage in said valve member open through said third and fourth valve surfaces, said valve member connecting said first and second passages through said third passage when said valve member is in an open position and isolating said first and second passages when said valve member is in a closed position, resilient means urging said valve surfaces into mating and sealing engagement without clearance, first and second conduits respectively connected to said first and second passages, the connection between at least one of said conduits and its associated passage being slidable to permit free movement of said valve surfaces toward and away from each other under the influence of said resilient means, at least one of said valve surfaces having a purging opening therein opened to said third passage when said valve member moves between said opened and closed position, and isolated therefrom when said valve is fully opened, the pressure in said chamber causing flow through said purging opening and purging of said third passage as said valve member moves between said opened and closed positions, said pressure in said chamber being maintained higher than the pressure in said first, second and third passages at least while said valve member is moving between said opened and closed position to prevent any flow of radioactive particulate out of said passages into said chamber.

2. A valve system as set forth in claim 1, wherein there are a plurality of purge openings arranged in a pattern so that a plurality of said purge openings are substantially simultaneously opened to said third passage as said movable valve member commences to move toward said closed position.

3. A valve system as set forth in claim 2, wherein the number of said purge openings open to said third passage decreases as said movable valve member approaches said closed position.

4. A valve system as set forth in claim 1, wherein said movable valve member is pivoted for oscillating rotation between said open position and said closed position.

5. A valve system as set forth in claim 4, wherein a gear is journaled for rotation in said housing, said movable valve member provides gear teeth meshing with said gear, and rotation of said gear moves said movable valve member between said open and closed positions.

6. A valve system as set forth in claim 1, wherein a flexible metallic seal is provided between said one of said conduits and its associated passage.

7. A valve system as set forth in claim 6, wherein said conduit extends into its associated passage to a location substantially adjacent to its associated valve surface.

8. A valve system as set forth in claim 7, wherein said conduits and passages extend vertically and said one of said conduits is the upper conduit.

* * * * *